(12) United States Patent
Kim et al.

(10) Patent No.: US 7,675,694 B2
(45) Date of Patent: Mar. 9, 2010

(54) WIDE-ANGLE LENS SYSTEM

(75) Inventors: Jin Jong Kim, Gyunggi-do (KR); Moon Sik Jung, Gyunggi-do (KR); Yong Joo Jo, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 101 days.

(21) Appl. No.: 12/155,831

(22) Filed: Jun. 10, 2008

(65) Prior Publication Data

US 2009/0002849 A1    Jan. 1, 2009

(30) Foreign Application Priority Data

Jun. 26, 2007    (KR) .................. 10-2007-0062721

(51) Int. Cl.
G02B 9/06    (2006.01)
G02B 9/04    (2006.01)

(52) U.S. Cl. ..................... 359/794; 359/793

(58) Field of Classification Search ............. 359/793, 359/794
See application file for complete search history.

(56) References Cited

U.S. PATENT DOCUMENTS 2,824,495 A * 2/1958 Gunter ................. 359/752
3,497,291 A * 2/1970 Woltche ............... 359/752
7,023,628 B1 * 4/2006 Ning .................... 359/781
7,595,938 B2 * 9/2009 Yamakawa et al. ...... 359/752

FOREIGN PATENT DOCUMENTS

JP    2007-3774    1/2007

* cited by examiner

Primary Examiner—David N Spector

(57) ABSTRACT

There is provided a wide-angle lens system having a wide angle of view and less distortion. The wide-angle lens system including: an object-side lens group disposed at an object side with respect to an aperture stop and having overall positive refractive power; and an image-side lens group disposed at an image side with respect to the aperture stop and having overall positive refractive power, wherein a focal length ratio between the object-side lens group and the image-side lens group satisfies following condition 1, $2 < FO/FI < 10$    condition 1, where FO is a focal length of the object-side lens group (FO>0) and FI is a focal length of the image-side lens group (FI>0). This wide-angle lens system sufficiently corrects distortion even in a wide angle of view, thereby ensuring an image with superior quality.

16 Claims, 4 Drawing Sheets

WIDE-ANGLE LENS SYSTEM

CROSS-REFERENCE TO RELATED APPLICATIONS

This application claims the priority of Korean Patent Application No. 2007-0062721 filed on Jun. 26, 2007, in the Korean Intellectual Property Office, the disclosure of which is incorporated herein by reference.

BACKGROUND OF THE INVENTION

1. Field of the Invention

The present invention relates to a wide-angle lens system, and more particularly, to a wide-angle imaging lens system for use in a camera installed in a vehicle, a camera for a mobile phone and a surveillance camera utilizing an imaging device such as a charge coupled device (CCD) or a complementary metal oxide semiconductor (CMOS).

2. Description of the Related Art

With a wide-angle lens system used more broadly and variously in a wide range of fields, for example for security or vehicle safety, diverse demands have arisen. Especially, a majority of wide-angle lens systems aiming at achieving a wide angle of view experience severe optical distortion, thus rendering it hard to identify an image of a peripheral portion of the lens system and represent perspective clearly. This accordingly has raised a demand for distortion correction.

Distortion is largely corrected by way of software. This however does not ensure representation of perspective or degrades resolution.

Meanwhile, in the conventional wide-angle lens system, in a major effort to enhance image quality, the number of lenses has been increased in place of adopting a spherical lens.

However, such a conventional lens system still undergoes distortion. Therefore, there has been a need for a novel wide-angle lens system to reduce distortion.

SUMMARY OF THE INVENTION

An aspect of the present invention provides a wide-angle lens system ensuring a sufficient angle of view and having less distortion.

Another aspect of the present invention provides a wide-angle lens system having a small effective aperture and short length on an optical axis, i.e., total length, while assuring a wide angle of view and less distortion.

According to an aspect of the present invention, there is provided a wide-angle lens system including: an object-side lens group disposed at an object side with respect to an aperture stop and having overall positive refractive power; and an image-side lens group disposed at an image side with respect to the aperture stop and having overall positive refractive power, wherein a focal length ratio between the object-side lens group and the image-side lens group satisfies following condition 1, $$2<FO/FI<10 \qquad \text{condition 1,}$$

where FO is a focal length of the object-side lens group (FO>0) and FI is a focal length of the image-side lens group (FI>0).

The object-side lens group may include: an object-side lens part disposed near the object side and having negative refractive power; and an image-side lens part disposed near the image side and having positive refractive power.

Particularly, the object-side lens part may include: at least one objective lens disposed at the object side; and a distortion correction lens disposed behind the objective lens to correct distortion.

The distortion correction lens may have overall negative refractive power.

The distortion correction lens may have negative refractive power on an optical axis and positive refractive power at a peripheral portion.

The distortion correction lens may have an object-side surface concaved toward the object side on the optical axis and convexed toward the object side at a peripheral portion.

The distortion correction lens may have at least one refractive surface formed of an aspherical surface.

A focal length ratio between the object-side lens part and the image-side lens part may satisfy following condition 2, $$0.3<|FOF/FOR|<0.5 \qquad \text{condition 2,}$$

where FOF is a focal length of the object-side lens part of the object-side lens group (FOF<0) and FOR is a focal length of the image-side lens part of the object-side lens group (FOR>0).

The distortion correction lens may have a shape satisfying following condition 3, $$0.25<CT/ET<0.55 \qquad \text{condition 3,}$$

where CT is a thickness of the distortion correction lens on an optical axis and ET is a thickness of the distortion correction lens at an effective aperture.

The objective lens may be formed of one or two meniscus-shaped lenses having a concave object-side surface.

According to another aspect of the present invention, there is provided a wide-angle lens system including: an object-side lens group disposed at an object side with respect to an aperture stop and having overall positive refractive power; and an image-side lens group disposed at an image side with respect to the aperture stop and having overall positive refractive power, the image-side lens group including: an object-side lens part disposed near the object side and having negative refractive power; and an image-side lens part disposed near the image side and having positive refractive power, wherein the object-side lens part includes: at least one objective lens disposed at the object side; and a distortion correction lens disposed behind the objective lens to correct distortion.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
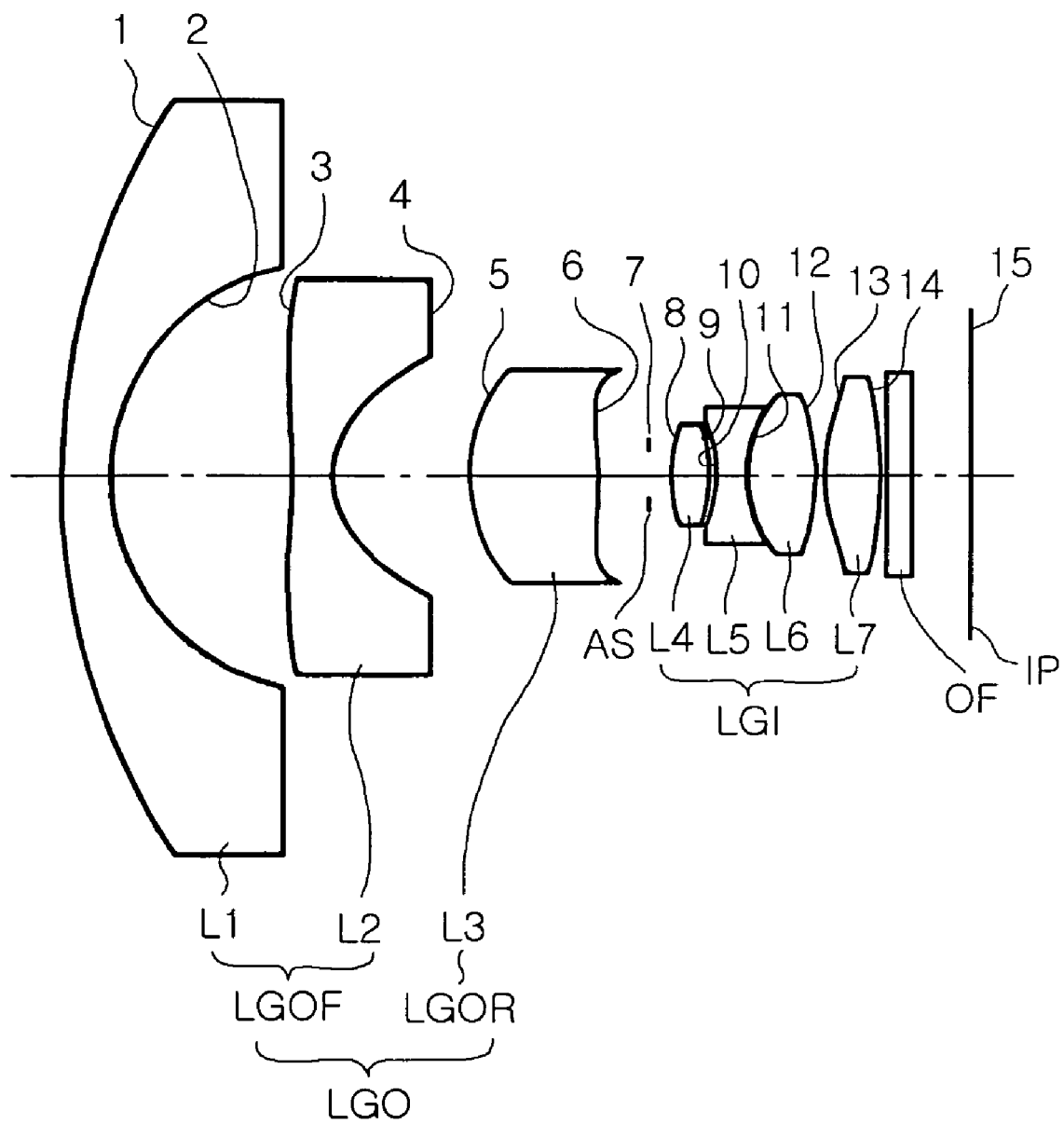
FIG. 1 is a lens configuration view illustrating a wide-angle lens system according to a first embodiment of the invention.
Figure 3:
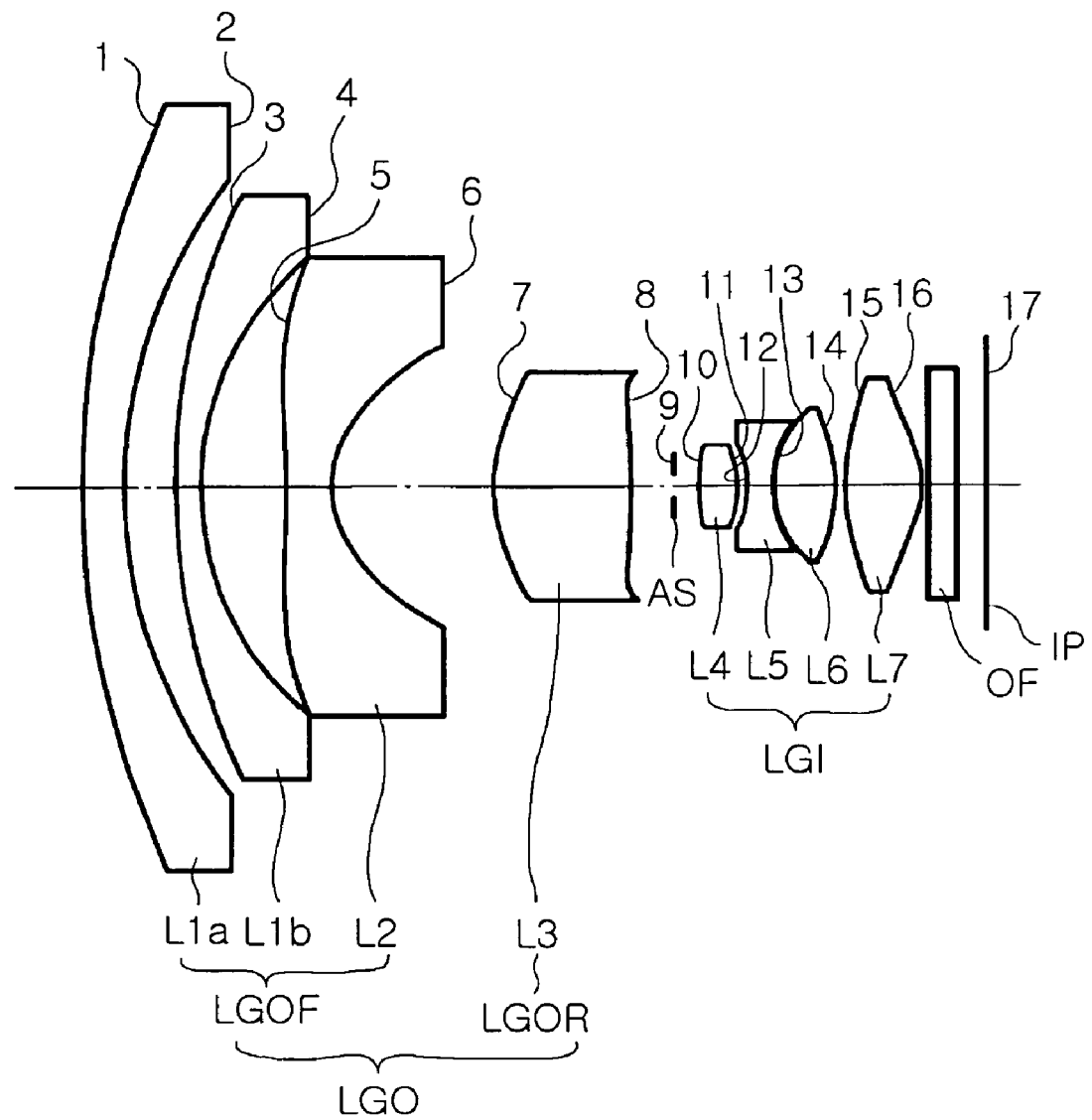
FIG. 3 is a lens configuration view illustrating a wide-angle lens system according to a second embodiment of the invention.

FIG. 1 is a lens configuration view illustrating a wide-angle lens system according to a first embodiment of the invention. FIG. 3 is a lens configuration view illustrating a wide-angle lens system according to a second embodiment of the invention. In the lens configuration views shown in FIGS. 1 and 3, the thicknesses, sizes and shapes of the lenses may be exaggerated for clarity. In particular, the shapes of spherical or aspherical surfaces shown in the views are only exemplary and should not be construed as limiting.

Referring to FIGS. 1 and 3, the wide-angle lens system of the present invention includes an object-side lens group LGO and an image-side lens group LGI. The object-side lens group LGO is disposed at an object side with respect to an aperture stop AS and has overall positive refractive power. The image-side lens group LGI is disposed at an image side with respect to the aperture stop AS and has overall positive refractive power.

Here, in the wide-angle lens system of the present invention, the object-side lens group includes an object-side lens part LGOF and an image-side lens part LGOR. The object-side lens part LGOF is disposed near the object side and has negative refractive power and the image-side lens part LGOR is disposed near the image side and has positive refractive power. This configuration allows the wide-angle lens system to attain a wide angle.

As described above, in the wide-angle lens system of the present invention, the object-side lens group LGO and the image-side lens group LGI have positive refractive power adequately distributed with respect to each other. Also, in the object-side lens group LGO, the object-side lens part LGOF and the image-side lens part LGOR have refractive power adequately distributed with respect to each other. This ensures a wide angle of the lens system, effective correction of various aberrations such as distortion and a smaller-sized lens system.

The object-side lens part LGOF disposed near the object side of the object-side lens group LGO includes at least one objective lens L1 located at the object side and a distortion correction lens L2 located behind the objective lens L1 to correct distortion and having negative refractive power.

Here, the objective lens L1 may be composed of one or two meniscus-shaped lenses having a concave object-side surface. The distortion correction lens L2 may have negative refractive power on an optical axis and positive refractive power at a peripheral portion.

As described above, the object-side lens part LGOF is composed of a plurality lenses with negative refractive power, i.e., the objective lens L1 having negative refractive power and the distortion correction lens L2. This reduces costs incurred for correcting aberration per lens, thereby leading to more effective correction of various aberrations such as distortion and coma.

Figure 4:
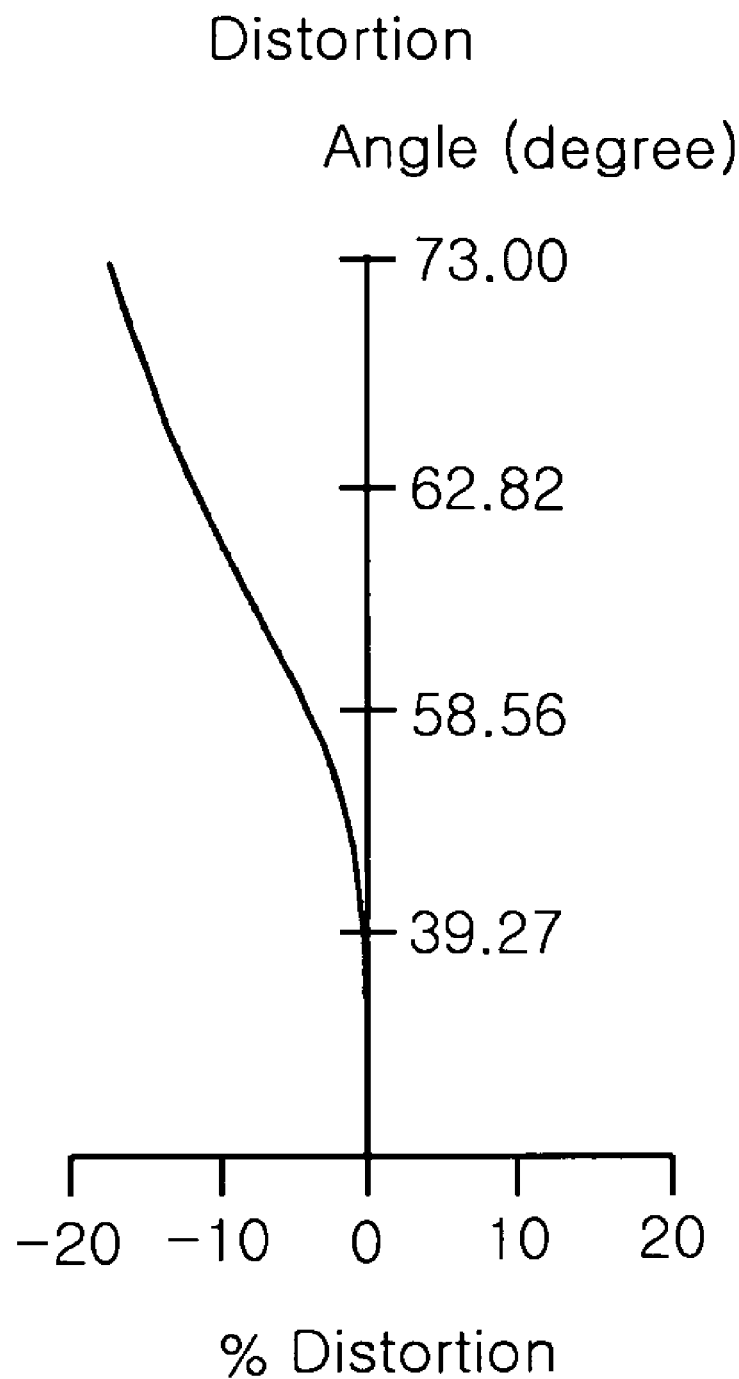
FIG. 4 is a graph illustrating distortion of the embodiment shown in FIG. 3.

Particularly, as shown in FIG. 3, when the objective lens L1 is composed of two sheets of lenses L1a and L1b, the lenses have smaller negative refractive power distributed thereto, respectively. Thus, as shown in FIG. 4, this leads to further decrease in distortion.

Here, to effectively correct distortion, the distortion correction lens L2 may have at least one refractive surface formed of an aspherical surface so as to allow refractive power on an optical axis to be different from refractive power at the peripheral portion (non-axial). To this end, the distortion correction lens L may be configured to have negative refractive power on an optical axis and positive refractive power at the peripheral portion thereof. Also, particularly, to facilitate aberrational correction, the distortion correction lens L2 may have both surfaces formed of an aspherical surface.

That is, the distortion correction lens L2 has negative refractive power on an optical axis, thus leading to an effect that the objective lens L1 has less negative refractive power. To this end, the distortion correction lens L2 may have the object-side surface concaved toward the object side on an optical axis. Also, to minimize distortion at the peripheral portion, the distortion correction lens L2 has positive refractive power at the peripheral portion. Thus, the distortion correction lens L2 may have the object-side surface convexed toward the peripheral portion.

Figure 2:
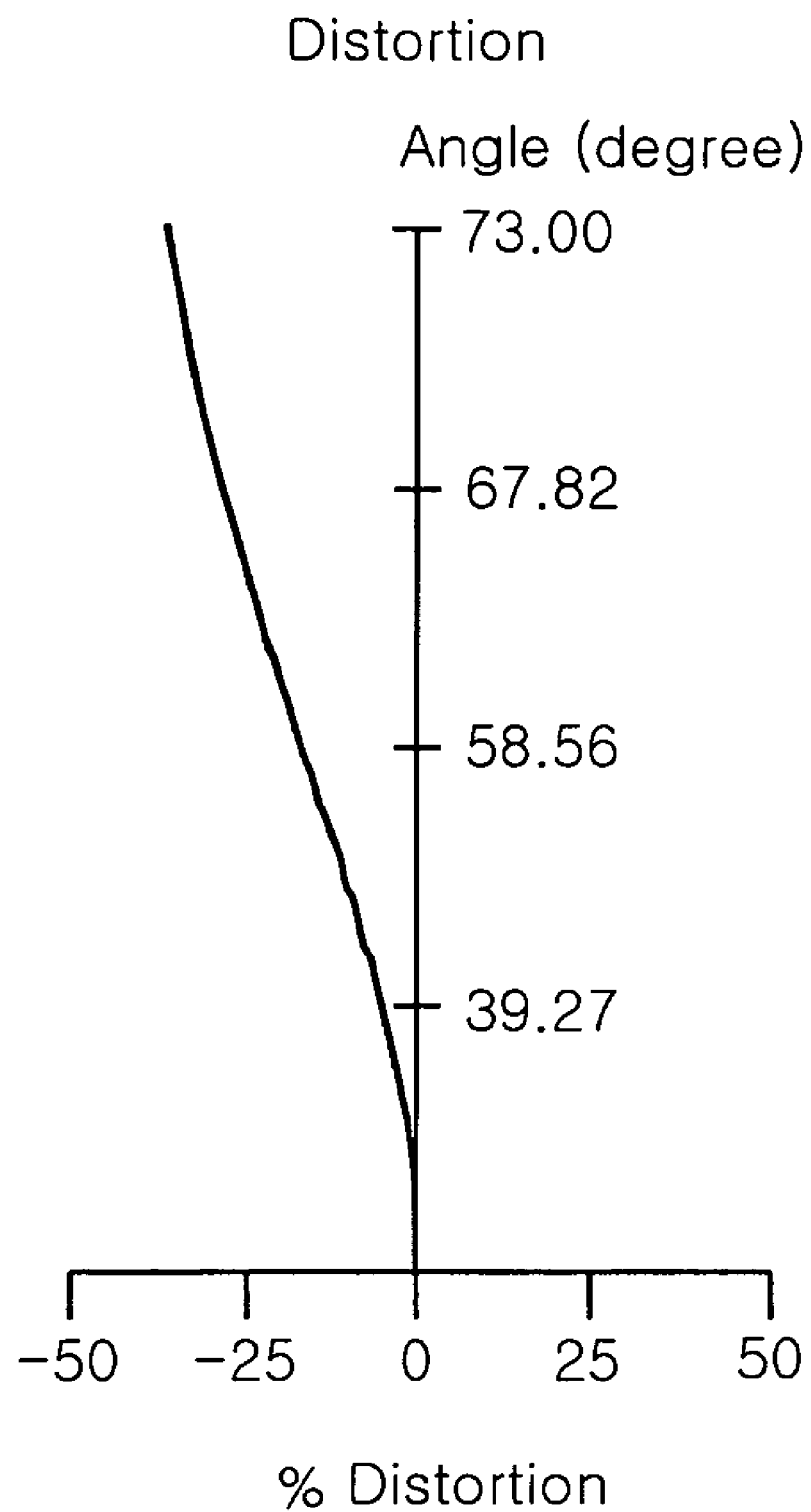
FIG. 2 is a graph illustrating distortion of the embodiment shown in FIG. 1.

Meanwhile, as long as the distortion correction lens L2 has negative refractive power on an optical axis and the positive refractive power at the peripheral portion, the object-side surface and image-side surface thereof are not limited in shape. For example, as shown in FIGS. 1 to 3, the distortion correction lens L2 may have the object-side surface concaved toward the object side on the optical axis and the object-side convexed toward the image side at the peripheral portion. That is, the distortion correction lens L2 has the object-side surface has an inflection point within an effective aperture and the image-side surface concaved toward the image side overall. Therefore, the distortion correction lens L2 has a double-concave shape on the optical axis and a convex object-side surface with a meniscus shape at the peripheral portion. However, in the wide-angle lens system of the present invention, the shape of the distortion correction lens L2 is not limited to those shown in FIGS. 1 and 3. For example, the distortion correction lens L2 may have a double-convex shape at the peripheral portion.

The image-side lens part LGOR of the object-side lens group LGO disposed near the image side includes a third lens L3 having positive refractive power and having at least one refractive surface formed of an asperical surface.

Meanwhile, the image-side lens group LGI has greater positive refractive power than the object-side lens group LGO. This shortens the optical system on the optical axis, i.e., total length, thereby ensuring a smaller wide-angle lens system. Moreover, the object-side lens group LGO has relatively smaller refractive power than the image-side lens group LGI. This maximally prevents the object-side lens group LGO from suffering various aberrations. Also, a doublet lens and an aspherical surface lens are appropriately arranged in the image-side lens group LGI to correct various aberrations caused in the object-side lens group LGO.

For example, the image-side lens group LGI, as shown in FIGS. 1 and 3, may include a fourth lens L4 having positive refractive power, a doublet lens where a fifth lens L5 of a double-concave shape and a sixth lens L6 of a double-convex shape are bonded together, and a seventh lens L7 having positive refractive power.

Here, the doublet lens where the fifth lens L5 of a double-concave shape and the sixth lens L6 of a double-convex shape are bonded together is arranged in the image-side lens group LGI, thereby effectively correcting chromatic aberration and ensuring less deterioration in performance resulting from concentricity.

However, the wide-angle lens system of the present invention is not limited in shape and number of the lenses constituting the image-side lens group LGI and refractive power distribution thereof. Also, the lenses may be designed in various forms and combinations.

With this overall configuration, operational effects of conditions 1 to 3 will be described.

Condition 1 prescribes a focal length ratio between the object-side lens group LGO and the image-side lens group LGI.

$$2 < FO/FI < 10 \qquad \text{condition 1,}$$

where FO is a focal length (FO>0) of the object-side lens group LGO and FI is a focal length (FI>0) of the image-side lens group LGI.

The object-side lens group LGO has relatively weaker refractive power than the image-side lens group LGI.

Deviation from a lower limit of condition 1 relatively increases refractive power of the object-side lens group LGO, thereby hardly allowing various aberrations caused in the object-side lens group LGO to be corrected by the image-side lens group LGI.

On the other hand, deviation from an upper limit of condition 1 hardly ensures a back focal length and a wide angle of view. Also, such a deviation increases an effective aperture and increases a total length of the optical system, i.e., length on the optical axis, thereby hampering miniaturization thereof.

Condition 2 governs a focal length ratio between the object-side lens part LGOF and the image-side lens part LGOR.

$$0.3 < |FOF/FOR| < 0.5 \qquad \text{condition 2,}$$

where FOF is a focal length (FOF<0) of the object-side lens part LGOF of the object-side lens group LGO and FOR is a focal length (FOR>0) of the image-side lens part LGOR of the object-side lens group (LGO).

Deviation from an upper limit of condition 2 increases the focal length of the object-side lens part LGOF, thereby hardly ensuring a wide angle of view. Meanwhile, deviation from a lower limit of condition 2 shortens the focal length of the object-side lens part LGOF to increase an effective aperture of the objective lens L1 disposed closest to the object side. This accordingly obstructs miniaturization of the wide-angle lens system.

Condition 3 prescribes a shape of the distortion correction lens L2 on an optical axis and within an effective aperture.

$$0.25 < CT/ET < 0.55 \qquad \text{condition 3,}$$

where CT is a thickness of the distortion correction lens L2 on an optical axis and ET is a thickness of the distortion correction lens L2 within an effective aperture.

Deviation from a lower limit of condition 3 leads to a greater difference between the thickness of the distortion correction lens on an optical axis and the thickness of the distortion correction lens within an effective aperture, thereby rendering it hard to manufacture the distortion correction lens L2.

Meanwhile, deviation from an upper limit of condition 3 renders distortion hardly correctable, thereby aggravating distortion.

Now, the present invention will be examined in greater detail through specific numerical examples.

As described above, a wide angle lens system according to first embodiment and second embodiments of the present invention includes an object-side lens group LGO disposed at an object side with respect to an aperture stop (AS) and having overall positive refractive power, and an image-side lens group (LGI) disposed at an image side with respect to the aperture stop (AS) and having overall positive refractive power.

Here, the object-side lens group (LGO) includes an object-side lens part LGOF disposed near the object side and having negative refractive power, and an image-side lens part LGOR disposed near the image side and having positive refractive power.

Moreover, the object-side lens part LGOF is composed of one (first embodiment) or two (second embodiment) sheets of objective lenses L1 disposed at the object side and having a concave object-side surface with a meniscus shape, and a distortion correction lens L2 disposed behind the objective lens L1 to correct distortion and having overall negative refractive power. Here, the distortion correction lens L2 has negative refractive power on an optical axis and positive refractive power at a peripheral portion.

Also, the aperture stop AS is disposed between the object-side lens group LGO and the image-side lens group LGI to block unnecessary light. In addition, an optical filter OF corresponding to an ultraviolet ray filter, a cover glass and the like is provided between the image-side lens group LGI and an image plane IP.

Each of the aspherical surfaces used in each of the embodiments herein is obtained from following Equation 1:

$$Z = \frac{cY^2}{1 + \sqrt{1 - (1+K)c^2Y^2}} + AY^4 + BY^6 + CY^8 + DY^{10} + EY^{12} + FY^{14} + \ldots, \qquad \text{Equation 1}$$

where Z is a distance from a vertex of a lens in an optical axis, Y is a distance in a direction perpendicular to the optical axis, C is a reciprocal number of a radius r of curvature at a vertex of the lens, K is a conic constant and A, B, C, D, E and F are aspherical coefficients.

First Embodiment

Table 1 below shows numerical values according to the first embodiment of the present invention.

FIG. 1 is a view illustrating a lens arrangement of the wide-angle lens system according to the first embodiment of the present invention, and FIG. 2 is a graph illustrating distortion of the embodiment shown in FIG. 1.

In the first embodiment, an F number FNo is 2.0, an angle of view is 146 degrees, a total focal length F is 1.12 mm, a focal length FO of the object-side lens group LGO is 29.43 mm, a focal length FOF of the object-side lens part LGOF is −1.91 mm, a focal length FOR of the image-side lens part LGOR is 5.38 mm and a focal length FI of the image-side lens group LGI is 3.28 mm.

TABLE 1

| Surface No. | Radius of curvature R | Thickness or distance t | Refractive index Nd | Abbe number Vd |
|---|---|---|---|---|
| 1 | 15.6 | 1.1 | 1.6 | 40.8 |
| 2 | 4.8 | 4.0 | | |
| *3 | −17.5 | 0.9 | 1.5 | 56.0 |
| *4 | 1.8 | 3.0 | | |
| *5 | 3.6 | 2.8 | 1.6 | 23.6 |
| *6 | −50.0 | 1.2 | | |
| 7 | ∞ | 0.5 | | |
| 8 | 4.2 | 0.8 | 1.6 | 60.3 |
| 9 | −3.9 | 0.2 | | |
| 10 | −3.2 | 0.7 | 1.8 | 27.5 |
| 11 | 2.8 | 1.5 | 1.6 | 60.3 |
| 12 | −4.8 | 0.2 | | |
| *13 | 4.3 | 1.3 | 1.5 | 56.0 |
| *14 | −5.2 | 1.3 | | |

In Table 1, * represents an aspherical surface, and in the first embodiment, refractive surfaces of the distortion correction lens (second lens L2) at the object side and image side, refractive surfaces of the third lens L3 at the object side and the image side and refractive surfaces of the seventh lens L7 at the object side and image side are aspherical.

Values of aspherical coefficients in the first embodiment according to Equation 1 are noted in Table 2 below.

TABLE 2

| Surface No. | K | A | B | C | D |
|---|---|---|---|---|---|
| *3 | 5.6629 | 3.90E-03 | -1.58E-04 | 4.11E-06 | -5.50E-08 |
| *4 | -0.8247 | -1.15E-02 | 1.39E-03 | 1.25E-04 | -2.03E-05 |
| *5 | 0.1887 | -6.15E-03 | 1.19E-03 | -9.90E-05 | 2.95E-06 |
| *6 | 0.0000 | -9.24E-04 | 4.07E-03 | -1.34E-03 | 2.09E-04 |
| *13 | -2.6611 | -9.23E-05 | 2.33E-03 | -1.28E-03 | 1.42E-04 |
| *14 | -2.3954 | 1.41E-02 | 1.75E-03 | -1.62E-03 | 1.91E-04 |

Second Embodiment

Table 3 below shows numerical values according to the second embodiment of the present invention.

FIG. 3 is a view illustrating a lens arrangement of the wide-angle lens system according to the second embodiment of the present invention, and FIG. 4 is a graph illustrating distortion of the wide-angle lens system shown in Table 3 and FIG. 3.

In the second embodiment, an F number FNo is 2.5, an angle of view is 146 degrees, a total focal length F is 0.88 mm, a focal length FO of the object-side lens group LGO is 9.42 mm, a focal length FOF of the object-side lens part LGOF is -1.98 mm, a focal length FOR of the image-side lens part LGOR is 4.92 mm and a focal length FI of the image-side lens group LGI is 2.34 mm.

TABLE 3

| Surface No. | Radius of curvature R | Thickness or distance t | Refractive index Nd | Abbe number Vd |
|---|---|---|---|---|
| 1 | 18.4 | 0.8 | 1.7 | 44.8 |
| 2 | 10.0 | 1.0 | | |
| 3 | 13.6 | 0.5 | 1.7 | 44.8 |
| 4 | 6.0 | 1.6 | | |
| *5 | -17.7 | 0.9 | 1.5 | 56.0 |
| *6 | 1.8 | 3.1 | | |
| *7 | 3.6 | 2.7 | 1.6 | 23.6 |
| *8 | -15.7 | 1.1 | | |
| 9 | ∞ | 0.3 | | |
| 10 | 4.2 | 0.8 | 1.6 | 60.3 |
| 11 | -2.2 | 0.2 | | |
| 12 | -1.9 | 0.5 | 1.8 | 27.5 |
| 13 | 2.0 | 1.2 | 1.6 | 60.3 |
| 14 | -3.6 | 0.2 | | |
| *15 | 4.2 | 1.5 | 1.5 | 56.0 |
| *16 | -1.7 | 0.6 | | |

In Table 3, * represents an aspherical surface, and in the second embodiment, refractive surfaces of the distortion correction lens (second lens L2) at the object side and image side, refractive surfaces of the third lens L3 at the object side and the image side and refractive surfaces of the seventh lens L7 at the object side and image side are aspherical.

Values of aspherical coefficients in the second embodiment according to Equation 1 are noted in Table 4 below.

TABLE 4

| Surface No. | K | A | B | C | D |
|---|---|---|---|---|---|
| *5 | -7.35 | 4.23E-03 | -1.53E-04 | 4.09E-06 | -6.29E-08 |
| *6 | -0.83 | -1.53E-02 | 1.42E-03 | 1.32E-04 | -1.82E-05 |
| *7 | 0.01 | -7.55E-03 | 1.20E-03 | -1.12E-04 | -1.54E-06 |
| *8 | 0 | 1.28E-03 | 3.32E-03 | -1.61E-03 | 2.60E-04 |
| *15 | -9.14 | -6.04E-04 | 2.52E-03 | -1.19E-03 | 1.66E-04 |
| *16 | -3.23 | 1.46E-02 | 1.63E-03 | -1.58E-03 | 2.18E-04 |

As can be seen from the above embodiments, the optical system with excellent distortion aberration characteristics as shown in FIGS. 2 and 4 is obtained according to the present invention. Particularly, as shown in FIG. 4, when the two sheets of objective lenses (L1) are employed as in the second embodiment, less distortion occurs.

In the meantime, values of conditions 1 to 3 for the above first and second embodiments are noted in Table 5.

TABLE 5

| | First embodiment | Second embodiment |
|---|---|---|
| Condition 1 (FO/FI) | 8.98 | 4.03 |
| Condition 2 (|FOF/FOR|) | 0.36 | 0.40 |
| Condition 3 (CT/ET) | 0.31 | 0.34 |

As noted in Table 5 above, the first and second embodiments of the present invention satisfy conditions 1 to 3.

As set forth above, according to exemplary embodiments of the invention, an optical system ensures a wide angle of view and sufficient distortion correction, thereby achieving superior image quality.

Moreover, the optical system can be reduced in size while assuring a wide angle of view and less distortion.

While the present invention has been shown and described in connection with the exemplary embodiments, it will be apparent to those skilled in the art that modifications and variations can be made without departing from the spirit and scope of the invention as defined by the appended claims.

What is claimed is:

1. A wide-angle lens system comprising:
   an object-side lens group disposed at an object side with respect to an aperture stop and having overall positive refractive power; and
   an image-side lens group disposed at an image side with respect to the aperture stop and having overall positive refractive power,
   wherein a focal length ratio between the object-side lens group and the image-side lens group satisfies following condition 1, $$2 < FO/FI < 10 \qquad \text{condition 1,}$$

where FO is a focal length of the object-side lens group (FO>0) and FI is a focal length of the image-side lens group (FI>0).

2. The wide-angle lens system of claim 1, wherein the object-side lens group comprises:
   an object-side lens part disposed near the object side and having negative refractive power; and
   an image-side lens part disposed near the image side and having positive refractive power.

3. The wide-angle lens system of claim 2, wherein the object-side lens part comprises:
   at least one objective lens disposed at the object side; and a distortion correction lens disposed behind the objective lens to correct distortion.

4. The wide-angle lens system of claim 3, wherein the distortion correction lens has overall negative refractive power.

5. The wide-angle lens system of claim 3, wherein the distortion correction lens has negative refractive power on an optical axis and positive refractive power at a peripheral portion.

6. The wide-angle lens system of claim 3, wherein the distortion correction lens has an object-side surface concaved toward the object side on the optical axis and convexed toward the object side at a peripheral portion.

7. The wide-angle lens system of claim 3, wherein the distortion correction lens has at least one refractive surface formed of an aspherical surface.

8. The wide-angle lens system of claim 2, wherein a focal length ratio between the object-side lens part and the image-side lens part satisfies following condition 2, $$0.3 < |FOF/FOR| < 0.5 \qquad \text{condition 2,}$$

where FOF is a focal length of the object-side lens part of the object-side lens group (FOF<0) and FOR is a focal length of the image-side lens part of the object-side lens group (FOR>0).

9. The wide-angle lens system of claim 3, wherein the distortion correction lens has a shape satisfying following condition 3, $$0.25 < CT/ET < 0.55 \qquad \text{condition 3,}$$

where CT is a thickness of the distortion correction lens on an optical axis and ET is a thickness of the distortion correction lens at an effective aperture.

10. The wide-angle lens system of claim 3, wherein the objective lens is formed of one or two meniscus-shaped lenses having a concave object-side surface.

11. A wide-angle lens system comprising:
an object-side lens group disposed at an object side with respect to an aperture stop and having overall positive refractive power; and
an image-side lens group disposed at an image side with respect to the aperture stop and having overall positive refractive power, the image-side lens group comprising: an object-side lens part disposed near the object side and having negative refractive power; and an image-side lens part disposed near the image side and having positive refractive power,
wherein the object-side lens part comprises: at least one objective lens disposed at the object side; and a distortion correction lens disposed behind the objective lens to correct distortion.

12. The wide-angle lens system of claim 11, wherein a focal length ratio between the object-side lens group and the image-side lens group satisfies following condition 1, $$2 < FO/FI < 10 \qquad \text{condition 1,}$$

where FO is a focal length of the object-side lens group (FO>0) and FI is a focal length of the image-side lens group (FI>0).

13. The wide-angle lens system of claim 11, wherein a focal length ratio between the object-side lens part and the image-side lens part satisfies following condition 2, $$0.3 < |FOF/FOR| < 0.5 \qquad \text{condition 2,}$$

where FOF is a focal length of the object-side lens part of the object-side lens group (FOF<0) and FOR is a focal length of the image-side lens part of the object-side lens group (FOR>0).

14. The wide-angle lens system of claim 11, wherein the distortion correction lens has a shape satisfying following condition 3, $$0.25 < CT/ET < 0.55 \qquad \text{condition 3,}$$

where CT is a thickness of the distortion correction lens on an optical axis and ET is a thickness of the distortion correction lens at an effective aperture.

15. The wide-angle lens system of claim 11, wherein the distortion correction lens has overall negative refractive power.

16. The wide-angle lens system of claim 11, wherein the distortion correction lens has an object-side surface concaved toward the object side on an optical axis and convexed toward the object side at a peripheral portion.

* * * * *